(12) United States Patent
Foster et al.

(10) Patent No.: US 12,384,439 B2
(45) Date of Patent: Aug. 12, 2025

(54) BULK AND TOTE CART

(71) Applicant: Rehrig Pacific Company, Los Angeles, CA (US)

(72) Inventors: Derick Foster, Cumming, GA (US); Dane Gin Mun Kalinowski, Foothill Ranch, CA (US); John Frederick Paulk, Cave Springs, AR (US)

(73) Assignee: Rehrig Pacific Company, Monterey Park, CA (US)

( * ) Notice: Subject to any disclaimer, the term of this patent is extended or adjusted under 35 U.S.C. 154(b) by 345 days.

(21) Appl. No.: 17/982,356

(22) Filed: Nov. 7, 2022

(65) Prior Publication Data

US 2023/0143029 A1    May 11, 2023

Related U.S. Application Data

(60) Provisional application No. 63/276,734, filed on Nov. 8, 2021.

(51) Int. Cl.
*B62B 3/02* (2006.01)
*B62B 3/00* (2006.01)

(52) U.S. Cl.
CPC .............. *B62B 3/025* (2013.01); *B62B 3/005* (2013.01)

(58) Field of Classification Search
CPC ................................ B62B 3/025; B62B 3/005
See application file for complete search history.

(56) References Cited

U.S. PATENT DOCUMENTS

| | | | |
|---|---|---|---|
| 1,036,395 A | 8/1912 | Williams | |
| 3,782,746 A * | 1/1974 | Isaacs | B62B 3/025 |
| | | | 280/33.996 |
| 4,165,088 A | 8/1979 | Nelson | |
| 4,740,010 A * | 4/1988 | Moskovitz | A47B 31/04 |
| | | | 108/177 |
| D521,709 S | 5/2006 | Johnson et al. | |
| 8,523,197 B2 * | 9/2013 | Baatz | B62B 3/025 |
| | | | 280/42 |
| D793,644 S * | 8/2017 | Walter | D34/17 |
| 9,896,118 B2 * | 2/2018 | Choi | B62B 3/007 |
| 9,913,533 B1 * | 3/2018 | Ke | B62B 3/002 |
| 9,925,998 B2 | 3/2018 | Ackerman et al. | |
| 10,239,547 B1 * | 3/2019 | Mohan | B62B 3/008 |
| 10,604,170 B1 * | 3/2020 | Davis | B62B 3/008 |
| 11,130,511 B2 * | 9/2021 | Abohammdan | B62B 3/005 |

(Continued)

FOREIGN PATENT DOCUMENTS

CN    209904837 U    1/2020
CN    109050603 B    11/2020

(Continued)

*Primary Examiner* — Erez Gurari
(74) *Attorney, Agent, or Firm* — Carlson, Gaskey & Olds, P.C.

(57) ABSTRACT

A cart includes a platform and a plurality of wheels supporting the platform. A plurality of retractable shelves are supported on the platform. The plurality of retractable shelves are reconfigurable between a deployed position and a retracted position. In the deployed position, a plurality of totes (or other smaller objects) can be supported on the shelves. In the retracted position, the cart is in an L Cart configuration. The platform is uncovered by the shelves and a larger item (or several larger items) can be placed on the platform.

20 Claims, 12 Drawing Sheets

(56) References Cited

U.S. PATENT DOCUMENTS

| | | | |
|---|---|---|---|
| 11,155,289 B2 * | 10/2021 | You | B62B 3/02 |
| D938,126 S * | 12/2021 | You | D34/21 |
| 11,767,045 B2 * | 9/2023 | Zesch | B62B 3/025 |
| | | | 280/651 |
| D1,040,455 S * | 8/2024 | Zhang | D34/21 |
| 12,089,735 B2 * | 9/2024 | Hanlon | A47F 5/13 |
| 2017/0055699 A1 | 3/2017 | Neuwirth et al. | |
| 2020/0405050 A1 * | 12/2020 | Liu | A47B 43/00 |
| 2022/0185352 A1 | 6/2022 | Ondrasik, Jr. et al. | |
| 2023/0040174 A1 * | 2/2023 | Visser | A01G 9/247 |
| 2023/0143029 A1 * | 5/2023 | Foster | B62B 3/025 |
| | | | 280/47.35 |
| 2023/0182796 A1 * | 6/2023 | Armbruster | A47L 13/51 |
| | | | 280/47.35 |
| 2023/0249730 A1 * | 8/2023 | Tong | B62B 3/022 |
| | | | 280/651 |
| 2024/0217571 A1 * | 7/2024 | Li | B62B 3/022 |
| 2024/0294202 A1 * | 9/2024 | Hsu | B62B 3/10 |
| 2024/0300740 A1 * | 9/2024 | Sevigny | B66F 9/063 |

FOREIGN PATENT DOCUMENTS

| | | |
|---|---|---|
| CN | 112660213 A | 4/2021 |
| CN | 214396901 U | 10/2021 |
| CN | 214565519 U | 11/2021 |

* cited by examiner

BULK AND TOTE CART

BACKGROUND

It is commonplace for a large format store to have several types of carts available to the store associates for certain processes throughout the store. For example, they may have a bulk cart, commonly referred to as a "L Cart" utilized to transport large items such as TVs. The same store will also have "Tote Carts" utilized for online/app order fulfilment and curbside vehicle delivery. These carts are separate pieces of equipment that are used and stored throughout the location which takes up large amounts of floor space, even when the carts nest.

SUMMARY

In an example embodiment described herein, both functions are combined into a single cart. This gives the store associate order picking flexibility between bulk items or totes so that they do not have to go throughout the store to find the appropriate cart. It also allows the store to consolidate and reduce the total number of equipment onsite along with reducing the lost floorspace.

In one example embodiment presented herein, a cart includes a platform and a plurality of wheels supporting the platform. A plurality of retractable shelves are supported on the platform. The plurality of retractable shelves are reconfigurable between a deployed position and a retracted position. In the deployed position, a plurality of totes (or other smaller objects) can be supported on the shelves. In the retracted position, the cart is in an L Cart configuration. The platform is uncovered by the shelves and a larger item (or several larger items) can be placed on the platform.

DESCRIPTION

Figure 1:
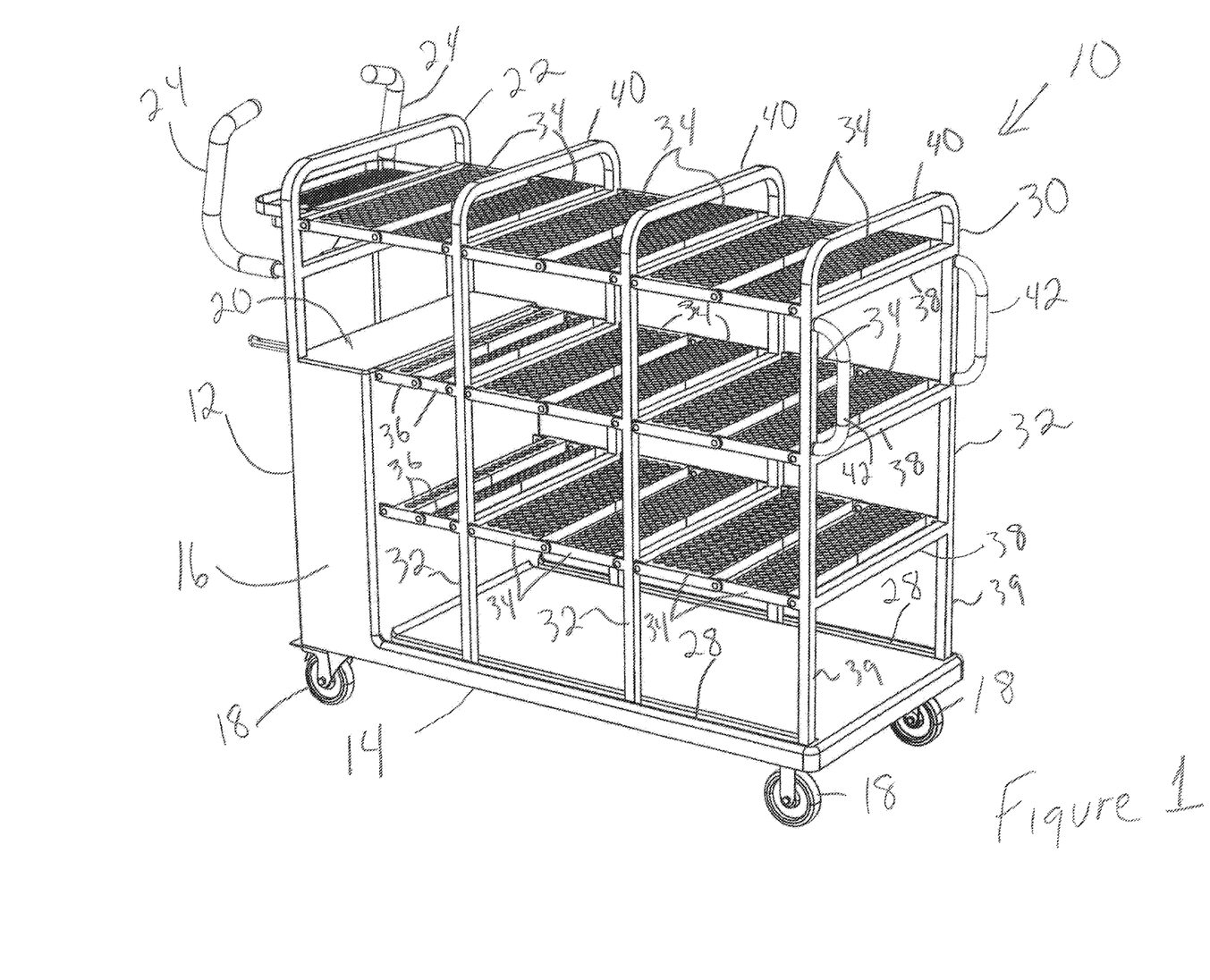
FIG. 1 shows the cart 10 in a tote-carrying configuration.

A cart 10 according to a first embodiment is shown in FIG. 1. The cart 10 includes a base 12 having a platform 14 extending forward from a lower end of a housing 16. The housing 16 extends vertically upward from a rear end of the platform 14. A plurality of casters 18 support the base 12. Two of the casters 18 may be fixed and two may be rotatable about a vertical axis, or all four could be rotatable. Optionally, two or more of the casters 18 could include wheels with hub motors for powering the cart 10. The housing 16 has an upper surface 20. A rear frame 22 extends upward from a rear end of the upper surface 20 and a pair of handles 24 extend rearward and upward from the rear frame 22.

The platform 14 includes a pair of elongated channels 28 extending along long edges thereof, perpendicular to the housing 16. A retractable shelf system 30 is secured to the housing 16 and received in the elongated channels 28 of the platform 14. The retractable shelf system 30 is shown in FIG. 1 in the deployed position.

The retractable shelf system 30 includes a plurality (in this example, three) vertical frame members 32 each received in both elongated channels 28. Between each adjacent pair of vertical frame members 32 are a plurality of shelves (in this example, three) each defined by a plurality of shelf segments 34 (in this example, two). The shelf segments 34 are pivotably connected to one another and to the vertical frame members 32.

There is also a shelf supported by the rearward-most vertical frame member 32 and the rear frame 22, which shelf includes a pair of shelf segments 34 pivotably connected to one another and to the vertical frame member 32 and the rear frame 22.

In this example there are two shelves defined between the rearward-most vertical frame member 32 and the housing 16, which shelves each includes a pair of smaller shelf segments 36 pivotably connected to one another, to the vertical frame member 32 and to the housing 16.

Each of the vertical frame members 32 may include a pair of vertical portions 39 having a plurality (e.g. three) of cross-bars 38 connected therebetween and an upper portion 40 connecting upper ends of the pair of vertical portions 39.

The forward-most vertical frame member 32 may include a pair of handles 42 projecting forward therefrom.

FIG. 1 shows the cart 10 in a tote-carrying configuration, although it could also be used for carrying other smaller items. In this configuration, four levels of support surfaces are created (three levels of shelves plus the platform 14.

Figure 2:
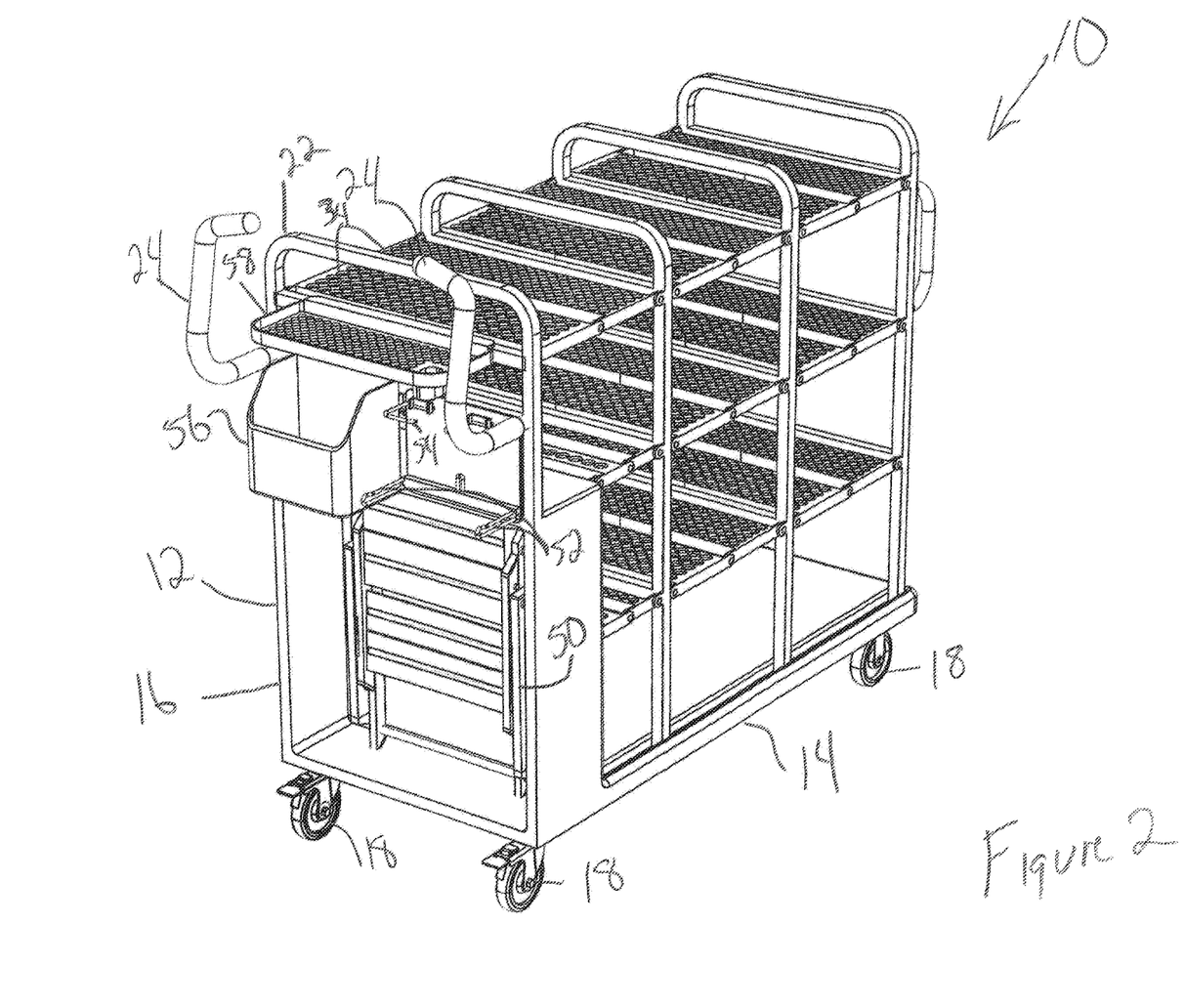
FIG. 2 is a rear perspective view of the cart of FIG. 1.

FIG. 2 is a rear perspective view of the cart 10. The housing 16 opens rearward to define a cavity within which can be carried, for example, a ladder 50, such as a small stepladder. The ladder 50 can be carried on a hook 52. Other hooks 54 can be provided to assist with carrying items. A small bin 56 may be mounted within the housing 16. A rear shelf 58 extends rearward from the rear frame 22. The rear shelf 58 may be coplanar with the uppermost shelf segments 34. Optionally, a battery could be provided within the housing for operating hub motors within the wheels of some of the casters 18.

Figure 3:
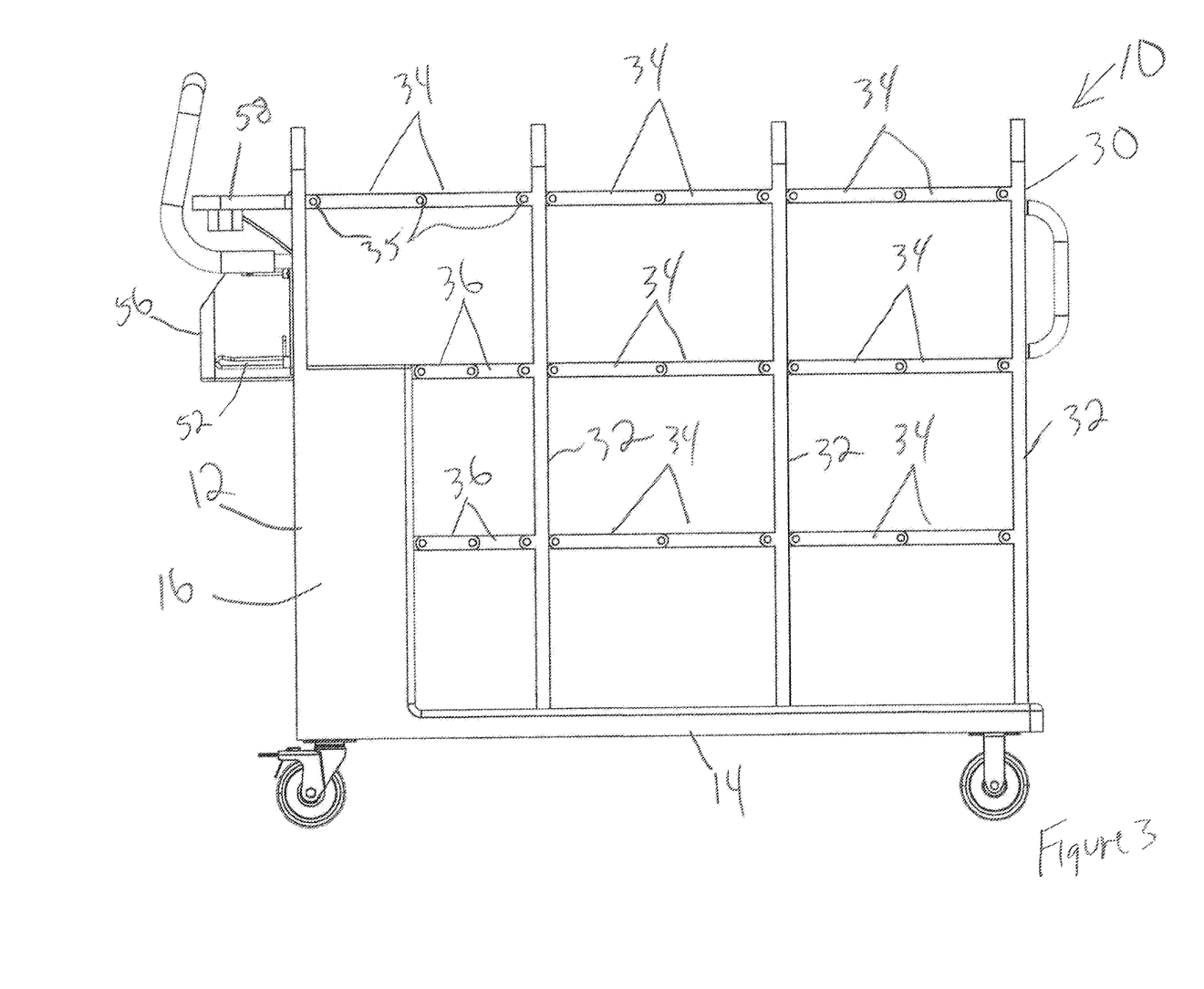
FIG. 3 is a side view of the cart of FIG. 1.

FIG. 3 is a side view of the cart 10 of FIG. 1. The shelf segments 34 are connected to one another and to the vertical frame members 32 by hinges 35.

Figure 4:
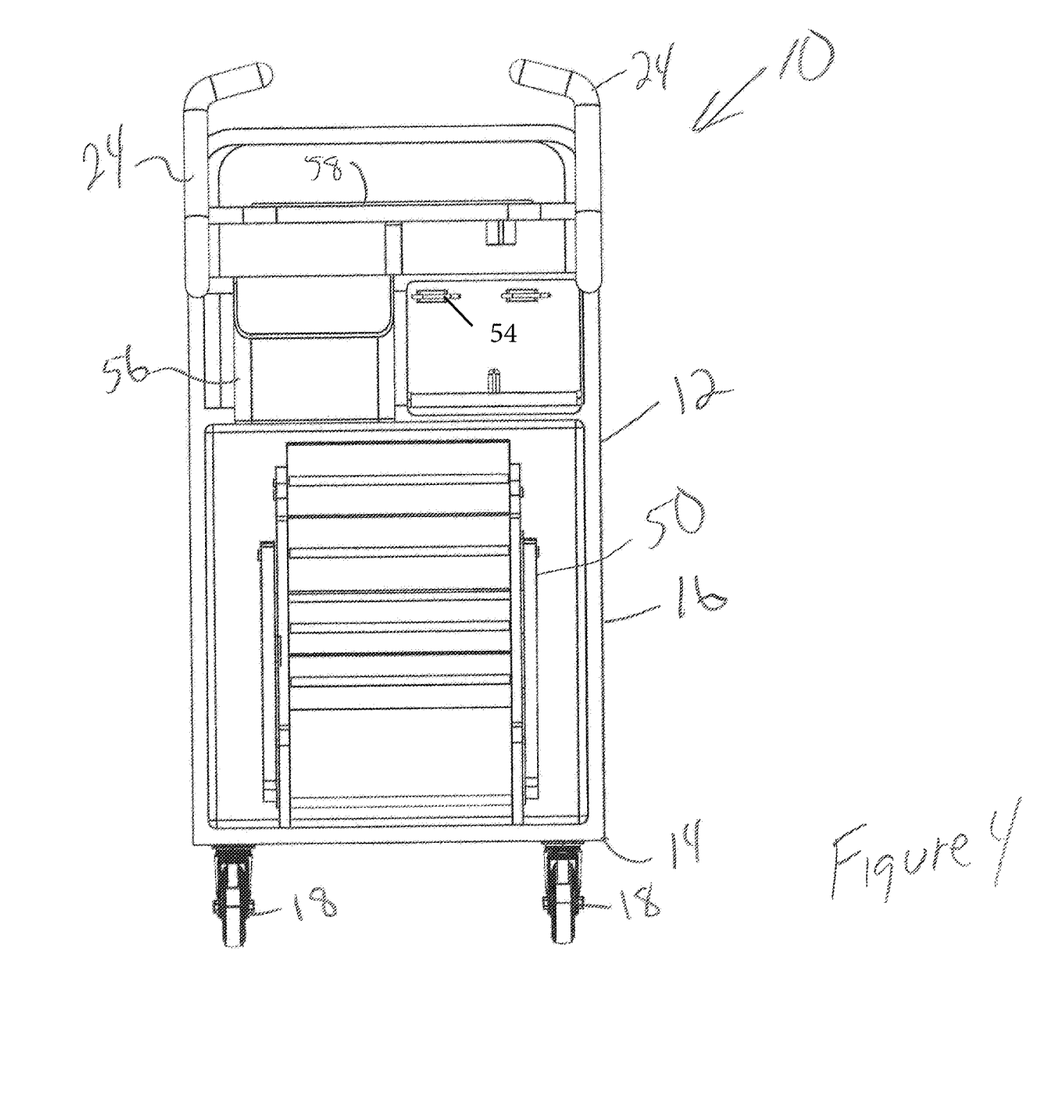
FIG. 4 is a rear view of the cart of FIG. 1.
Figure 5:
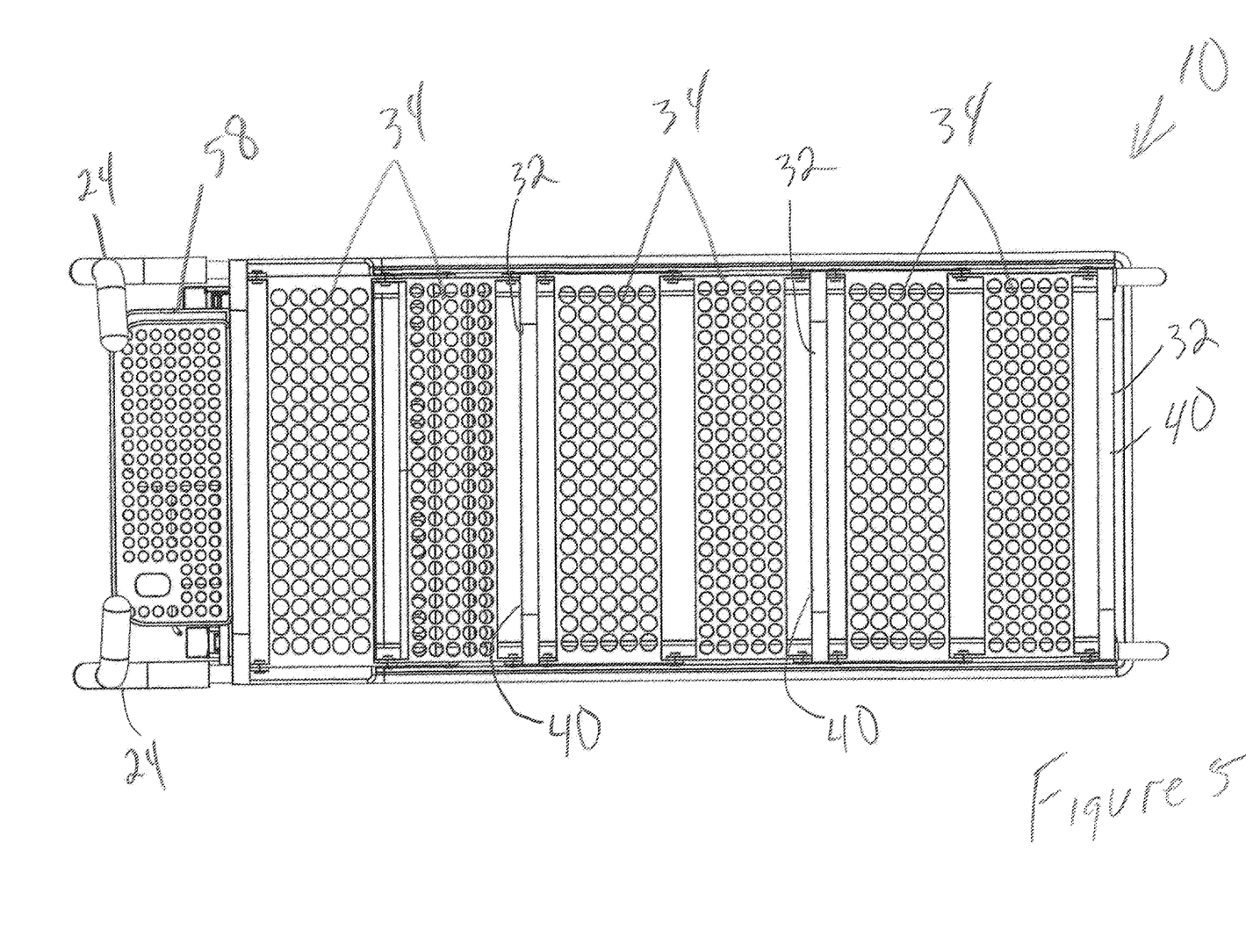
FIG. 5 is a top view of the cart of FIG. 1.

FIG. 4 is a rear view of the cart 10 again showing the ladder 50, the hook 54, and the small bin 56 in the housing 16. FIG. 5 is a top view of the cart 10, showing upper support surfaces of the uppermost shelves and shelf segments 34 and rear shelf 58.

Figure 6:
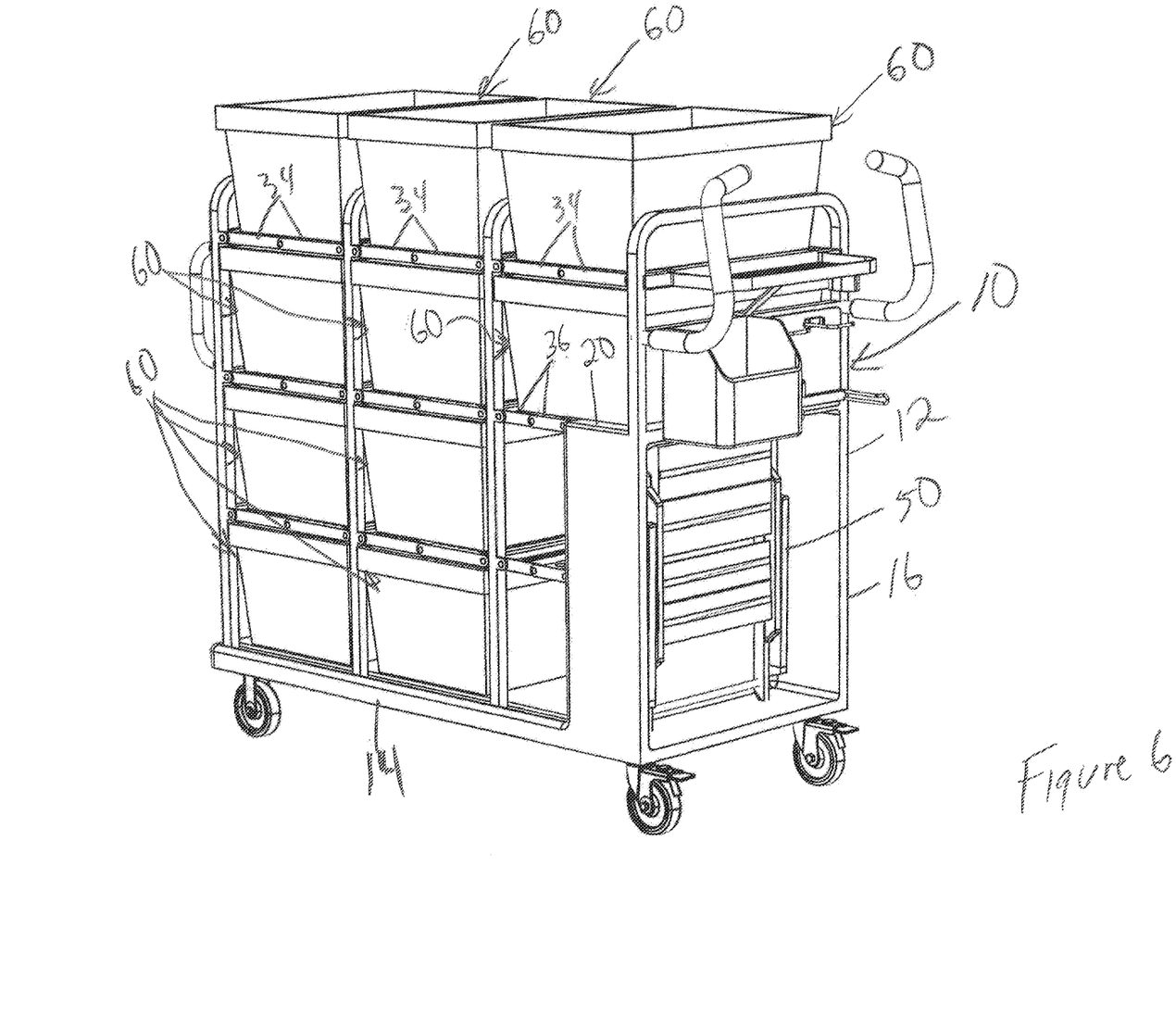
FIG. 6 shows the cart of FIG. 1 with a plurality of totes carried thereon.

As shown in FIG. 6, in this configuration, the shelves can be loaded with totes 60. The totes 60 are supported on each adjacent pair of shelf segments 34 between each adjacent pair of vertical frame members 32. There is also one tote 60 supported on the upper surface 20 of the housing 16 and the smaller shelf segments 36. Two totes 60 are supported on the platform 14. In this configuration, the cart 10 can be used to carry ten totes 60. None of the totes 60 are supported on other totes 60, so each can be removed and replaced independently. The totes 60 may be used for picking orders, such as orders place online, app orders, curbside pickup, or the like, where each order is placed into a different tote 60. In this example, the totes 60 are sized such that they each occupy substantially all of the space in each bay defined by the shelves.

Figure 7:
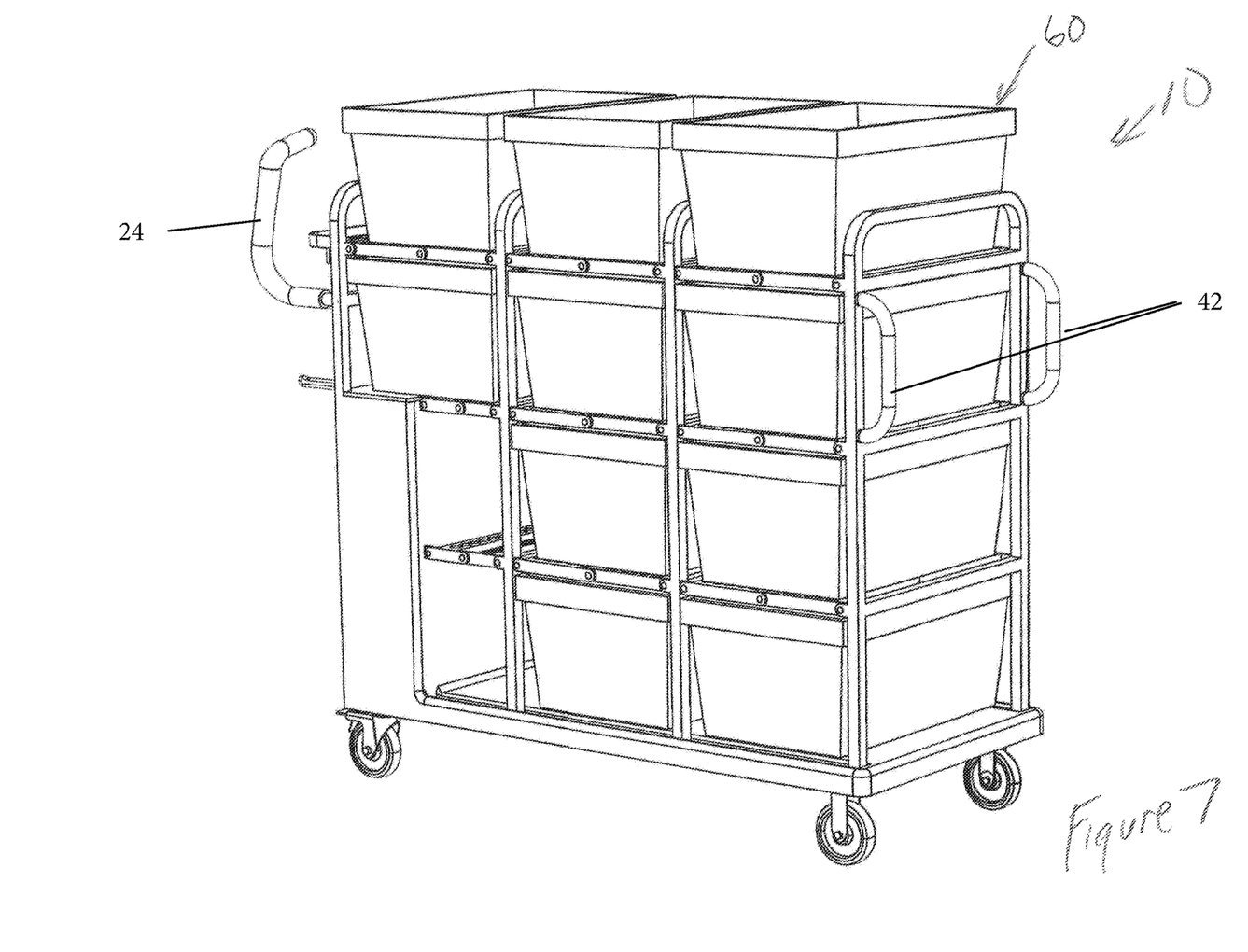
FIG. 7 is a front perspective view of the cart and totes of FIG. 6.

FIG. 7 is a front perspective view of the cart 10 and totes 60 of FIG. 6. The loaded cart 10 and totes 60 could be pulled or pushed by the handles 42 and/or 24.

Figure 8:
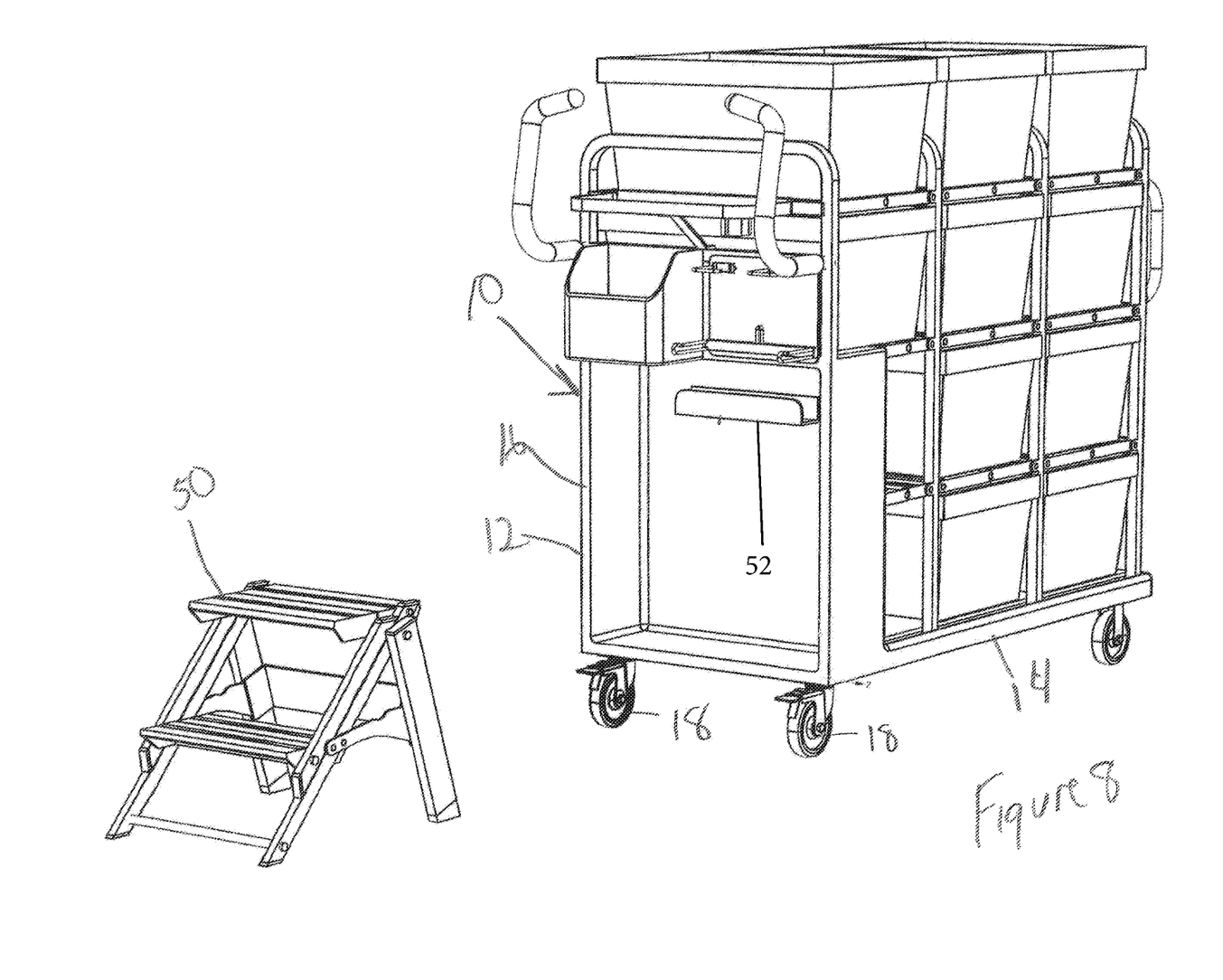
FIG. 8 shows the cart and totes of FIG. 6 with the ladder removed for use.

As shown in FIG. 8, the ladder 50 can be removed from the hook 52 in the housing 16 and after use can be returned to the hook 52.

Figure 9:
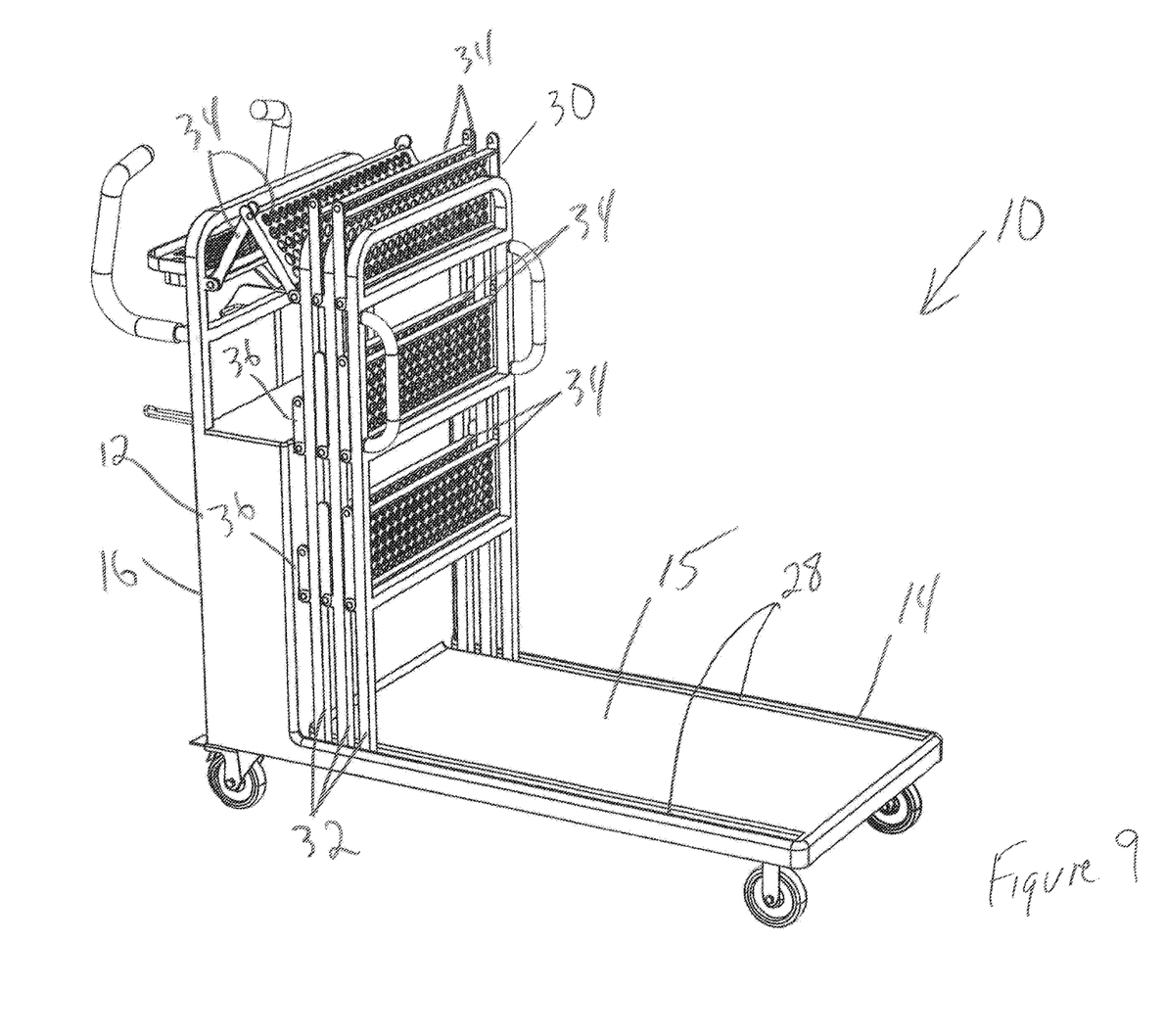
FIG. 9 shows the cart of FIG. 1 reconfigured to an L-cart configuration.

FIG. 9 shows the cart 10 reconfigured to an L-cart configuration for moving large items (such as televisions or furniture) on the upper surface 15 of the platform 14. The retractable shelf system 30 is retracted toward the housing 16 to expose most of the upper surface 15 of the platform 14. The vertical frame members 32 are slid toward the housing 16, which causes the shelf segments 34 and smaller shelf segments 36 to pivot upward to a substantially vertical orientation. The cart 10 in the L-configuration can be used to move a large item and then returned to the shelf configuration of FIG. 1 for carrying totes again. The cart 10 can be returned to the L-cart configuration whenever it is necessary to move a large item.

Figure 10:
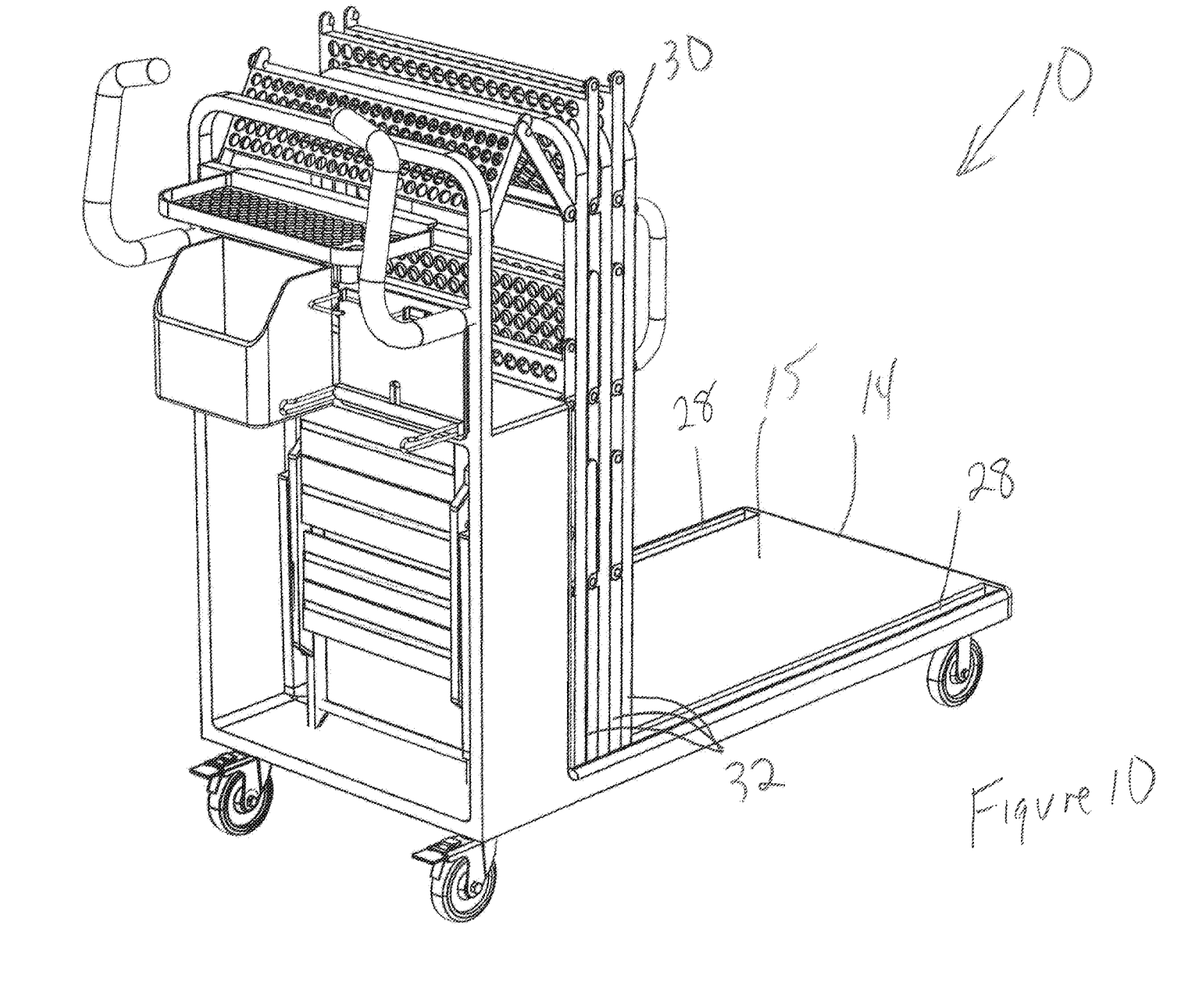
FIG. 10 is a rear perspective of the cart of FIG. 9 in the L-cart configuration.
Figure 11:
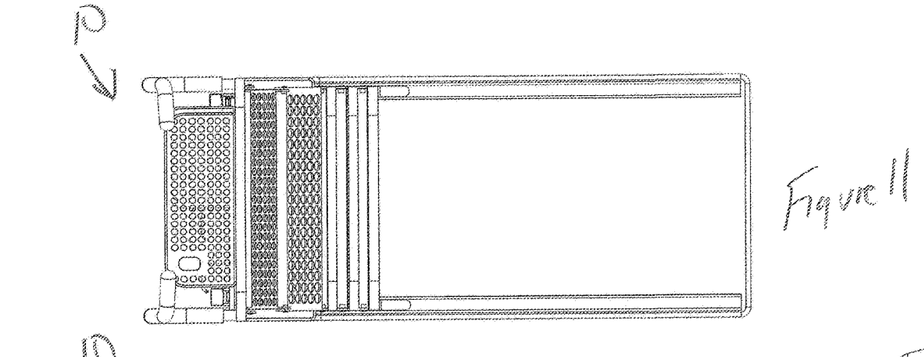
FIG. 11 is a top view of the cart of FIG. 9.
Figure 12:
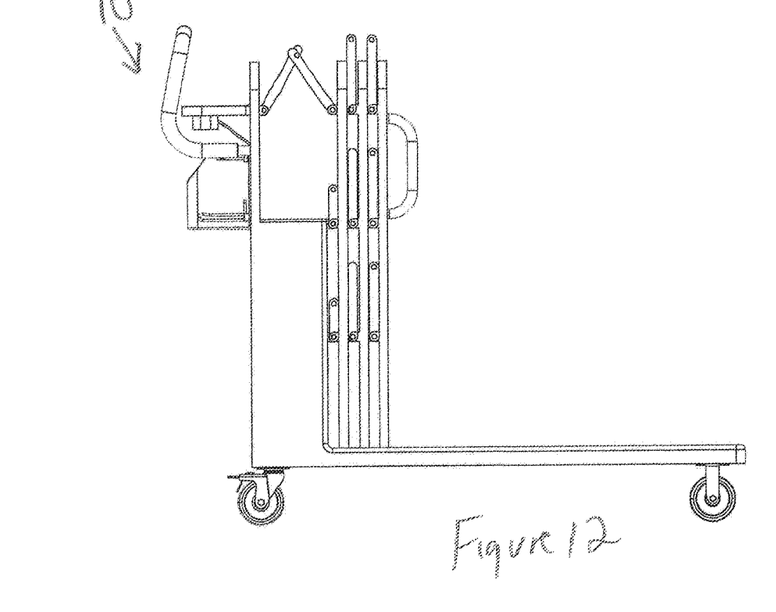
FIG. 12 is a side view of the cart of FIG. 9.
Figure 13:
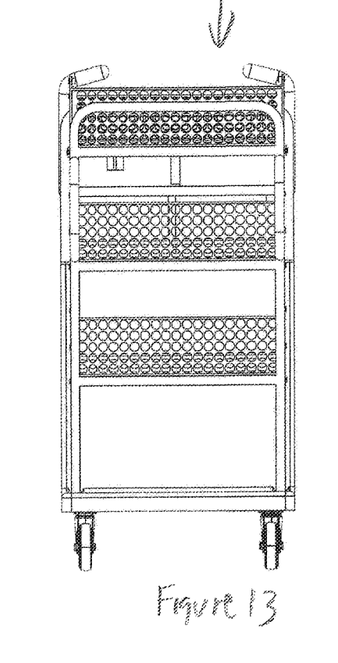
FIG. 13 is a front view of the cart of FIG. 9.

FIG. 10 is a rear perspective of the cart 10 of FIG. 9 in the L-cart configuration. FIG. 11 is a top view of the cart 10 of FIG. 9. FIG. 12 is a side view of the cart 10 of FIG. 9. FIG. 13 is a front view of the cart 10 of FIG. 9.

Figure 14:
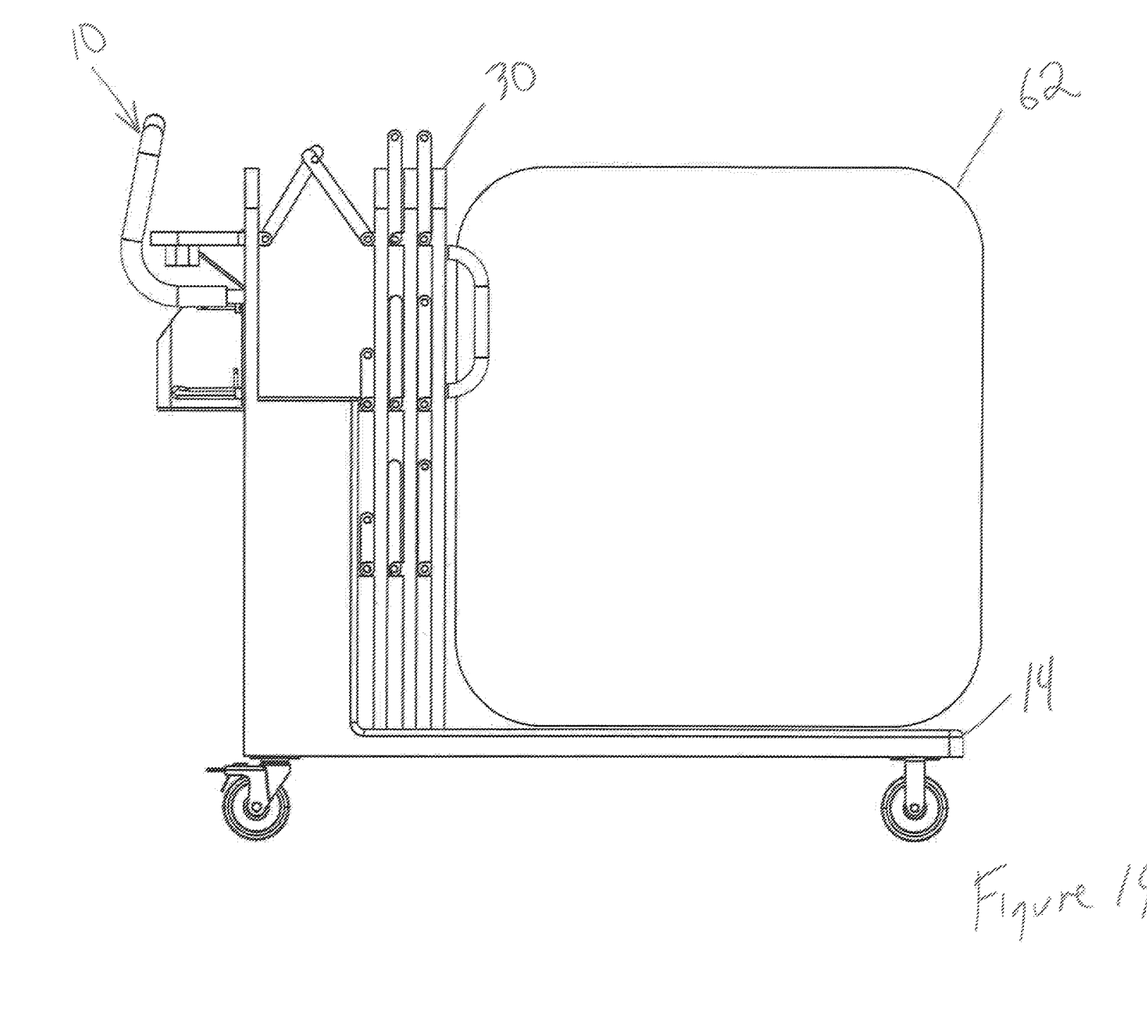
FIG. 14 shows a side view of the cart of FIG. 9 with a large item supported on the platform in the L-cart configuration.

FIG. 14 shows a side view of the cart 10 of FIG. 9 with a large item 62 (such as a television or other large box) supported on the platform 14 in the L-cart configuration. The large item 62 is supported on the platform 14 in front of the retracted retractable shelf system 30.

Optionally, the cart 10 may also be provided with a power braking system, which can lock two or all of the wheels when the user presses a button and/or whenever the ladder 50 is removed from the hook 54. If hub motors are provided in at least some of the wheels, braking can be provided via the hub motors.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A cart comprising:
   a platform;
   a plurality of wheels supporting the platform; and
   a plurality of retractable shelves supported on the platform, wherein the plurality of retractable shelves are reconfigurable between a deployed position and a retracted position, wherein the plurality of retractable shelves each includes a plurality of shelf segments pivotably secured to one another.

2. The cart of claim 1 wherein the plurality of retractable shelves are supported on a plurality of vertical frame members supported on the platform wherein the plurality of vertical frame members are movable between a deployed position and a retracted position on the platform.

3. The cart of claim 2 wherein the plurality of shelf segments are pivotably secured to the plurality of vertical frame members.

4. The cart of claim 3 further including a housing extending upward from the platform, wherein the plurality of retractable shelves are movable toward the housing to the retracted position and away from the housing to the deployed position.

5. The cart of claim 4 further including a pair of handles mounted to the housing.

6. The cart of claim 4 wherein a first shelf segment of the plurality of shelf segments is pivotably connected to the housing.

7. The cart of claim 6 wherein the housing has an upper surface coplanar with upper surfaces of at least one of the plurality of retractable shelves in the deployed position.

8. The cart of claim 7 further including a stepladder stored on the housing.

9. The cart of claim 1 in combination with a plurality of totes supported on the plurality of retractable shelves in the deployed position.

10. The cart of claim 1 in combination with an item supported on the platform while the plurality of retractable shelves are in the retracted position.

11. A cart comprising:
    a platform;
    a plurality of wheels supporting the platform;
    a housing extending upward from the platform;
    a plurality of vertical frame members supported on the platform and movable toward the housing to a retracted position and away from the housing to a deployed position; and
    a plurality of first shelves each supported by an adjacent pair of vertical frame members, wherein each first shelf includes a pair of hingeably connected first shelf segments, each hingeably connected to one of the associated pair of vertical frame members.

12. The cart of claim 11 further including a plurality of second shelves each including a pair of hingeably connected second shelf segments, wherein one of each of the pair of second shelf segments is hingeably connected to one of the plurality of vertical frame members and the other of each of the pair of second shelf segments is hingeably connected to the housing.

13. A method for using a cart including:
    a) deploying a plurality of retractable shelves on a platform, wherein the plurality of retractable shelves are supported by a plurality of vertical frame members including a forward-most vertical frame member and a rear frame member, wherein deploying further includes moving the forward-most vertical frame member away from the rear frame member;
    b) placing a plurality of smaller objects on the plurality of retractable shelves after step a);
    c) retracting the plurality of retractable shelves after step b); and
    d) placing a larger object on the platform after step c).

14. The method of claim 13 wherein step a) includes moving the plurality of vertical frame members so that they are spaced from one another on the platform, a plurality of shelf segments pivotably connected to one another and to the plurality of vertical frame members.

15. The method of claim 13 wherein the larger object is a television or furniture.

16. The cart of claim 2 wherein the plurality of vertical frame members includes three vertical frame members.

17. The cart of claim 1 wherein the plurality of retractable shelves are supported on a plurality of vertical frame members supported on the platform and wherein the plurality of vertical frame members include a rear vertical frame member and a forward-most vertical frame member, wherein the forward-most vertical frame member is movable toward and away from the rear vertical frame member.

18. The cart of claim 17 wherein the plurality of vertical frame members includes three vertical frame members.

19. A cart comprising:
   a platform;
   a plurality of wheels supporting the platform;
   a plurality of vertical frame members supported on the platform, the plurality of vertical frame members including a rear vertical frame member and a forward-most vertical frame member, wherein the forward-most vertical frame member is movable toward and away from the rear vertical frame member; and
   a plurality of retractable shelves supported on the plurality of vertical frame members.

20. The cart of claim 19 wherein the plurality of vertical frame members includes three vertical frame members.

\* \* \* \* \*